United States Patent
Tung et al.

(10) Patent No.: US 9,563,345 B2
(45) Date of Patent: Feb. 7, 2017

(54) ELECTRONIC DEVICE AND METHOD FOR CONTROLLING THE SAME

(71) Applicant: MStar Semiconductor, Inc., Hsinchu Hsien (TW)

(72) Inventors: Yi-Shin Tung, Zhubei (TW); Yi-Chin Huang, Zhubei (TW); Chia-Chiang Ho, Zhubei (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 207 days.

(21) Appl. No.: 14/092,396

(22) Filed: Nov. 27, 2013

(65) Prior Publication Data

US 2014/0181669 A1 Jun. 26, 2014

(30) Foreign Application Priority Data

Dec. 20, 2012 (TW) ............... 101148653 A

(51) Int. Cl.
*G06F 3/0485* (2013.01)
*G06F 3/0346* (2013.01)

(52) U.S. Cl.
CPC .......... *G06F 3/0485* (2013.01); *G06F 3/0346* (2013.01)

(58) Field of Classification Search
CPC .......... G06F 3/011; G06F 3/016; G06F 3/017; G06F 3/038; G06F 3/0338; G06F 3/0485; G06F 21/36; G06F 21/31; G06F 21/00; G06F 3/031; G06F 3/0346; G06F 1/1626

See application file for complete search history.

(56) References Cited

U.S. PATENT DOCUMENTS

| | | | | |
|---|---|---|---|---|
| 9,213,419 | B1* | 12/2015 | Cassidy | G06F 3/03 |
| 2004/0100441 | A1* | 5/2004 | Rekimoto | G06F 1/1626 345/158 |
| 2008/0072902 | A1* | 3/2008 | Setzer | A61M 16/00 128/204.21 |
| 2009/0197635 | A1* | 8/2009 | Kim | G06F 3/0346 455/550.1 |
| 2009/0262074 | A1* | 10/2009 | Nasiri | A63F 13/06 345/158 |
| 2009/0265627 | A1* | 10/2009 | Kim | G06F 1/1626 715/702 |
| 2010/0001980 | A1* | 1/2010 | Kim | G06F 1/1626 345/184 |
| 2010/0042954 | A1* | 2/2010 | Rosenblatt | G06F 1/1626 715/863 |

(Continued)

FOREIGN PATENT DOCUMENTS

| CN | 101082837 | 12/2007 |
|---|---|---|
| CN | 101430605 | 5/2009 |

(Continued)

OTHER PUBLICATIONS

China Patent Office "Office Action" issued on Jun. 1, 2016.

*Primary Examiner* — Md Saiful A Siddiqui
(74) *Attorney, Agent, or Firm* — WPAT, PC; Justin King; Jonathan Chiang

(57) ABSTRACT

A method for controlling an electronic device is provided. The method includes detecting a first tilt angle between the electronic device and a reference plane, and controlling the electronic device to perform an operating according to the first tilt angle. The operation is associated with a user interface operation or an audio/video playback operation.

33 Claims, 12 Drawing Sheets

(56) References Cited

U.S. PATENT DOCUMENTS

| | | | | |
|---|---|---|---|---|
| 2010/0125816 A1* | 5/2010 | Bezos | ............... | G06F 1/1626 |
| | | | | 715/863 |
| 2011/0221667 A1* | 9/2011 | Lee | ............... | G01B 7/30 |
| | | | | 345/156 |
| 2011/0221777 A1* | 9/2011 | Ke | ............... | G06F 3/017 |
| | | | | 345/649 |
| 2011/0307213 A1* | 12/2011 | Zhao | ............... | G01C 17/30 |
| | | | | 702/153 |
| 2012/0056878 A1* | 3/2012 | Miyazawa | ............... | G06F 1/1626 |
| | | | | 345/419 |
| 2013/0002726 A1* | 1/2013 | Orr | ............... | G01C 21/36 |
| | | | | 345/684 |
| 2014/0168129 A1* | 6/2014 | Miyazaki | ............... | G06F 1/1626 |
| | | | | 345/173 |
| 2015/0135108 A1* | 5/2015 | Pope | ............... | G06K 9/00006 |
| | | | | 715/767 |

FOREIGN PATENT DOCUMENTS

| | | |
|---|---|---|
| CN | 102411436 | 4/2012 |
| CN | 102467340 | 5/2012 |
| TW | 200704920 A | 7/2005 |
| TW | 200934212 A | 1/2008 |

* cited by examiner

ELECTRONIC DEVICE AND METHOD FOR CONTROLLING THE SAME

This application claims the benefit of Taiwan application Serial No. 101148653, filed Dec. 20, 2012, the subject matter of which is incorporated herein by reference.

BACKGROUND OF THE INVENTION

Field of the Invention

The invention relates in general to a method for controlling an electronic device, and more particularly, to a method for controlling an electronic device through detecting a tilt angle of the electronic device.

Description of the Related Art

Smart phones and tablet computers are currently common electronic devices, and are usually operated in response to a user instruction entered through a touch interface. Complications may be involved when entering instructions into a touch interface. For example, when a user wishes to search and play a desired image file from numerous images stored in a cell phone, both hands of a user are required in order to complete such operation. That is, the cell phone needs to be held in one hand, while the other hand is required to continuously slide on the touch interface to change a displayed image file. The above manipulations may be inconvenient under certain circumstances (e.g., when the user is on a crowded public transportation vehicle).

SUMMARY OF THE INVENTION

It is an object of the present invention to provide an electronic device and a method for controlling the electronic device, in a way that the electronic device can be controlled according to a tilt angle of the electronic device.

It is another object of the present invention to provide an electronic device and a method for controlling the electronic device, in a way that the electronic device can be controlled according to a combination of tilt angles of the electronic device.

According to an embodiment of the present invention, a method for controlling an electronic device is provided. The method includes detecting a first tilt angle between the electronic device and a reference plane, and controlling the electronic device to perform an operation according to the first tilt angle. The operation is associated with a user interface operation or an audio/video playback operation.

According to another embodiment of the present invention, an electronic device is provided. The electronic device includes: a screen; a gravity sensor, configured to detect a first tilt angle between the electronic device and a reference plane; and a control unit, configured to control the electronic device to perform an operation according to the first tilt angle. The operation is associated with a user interface operation or an audio/video playback operation.

With the embodiments, a user can control operations of the electronic device through detecting the tilt angle of the electronic device, so as to prevent a situation of requiring both hands for manipulating the electronic device as in the prior art. Further, a user may also set a value of the tilt angle or combinations of tilt angles as well as corresponding operations of the electronic device according to personal usage habits to provide an even more convenient method for controlling the electronic device.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
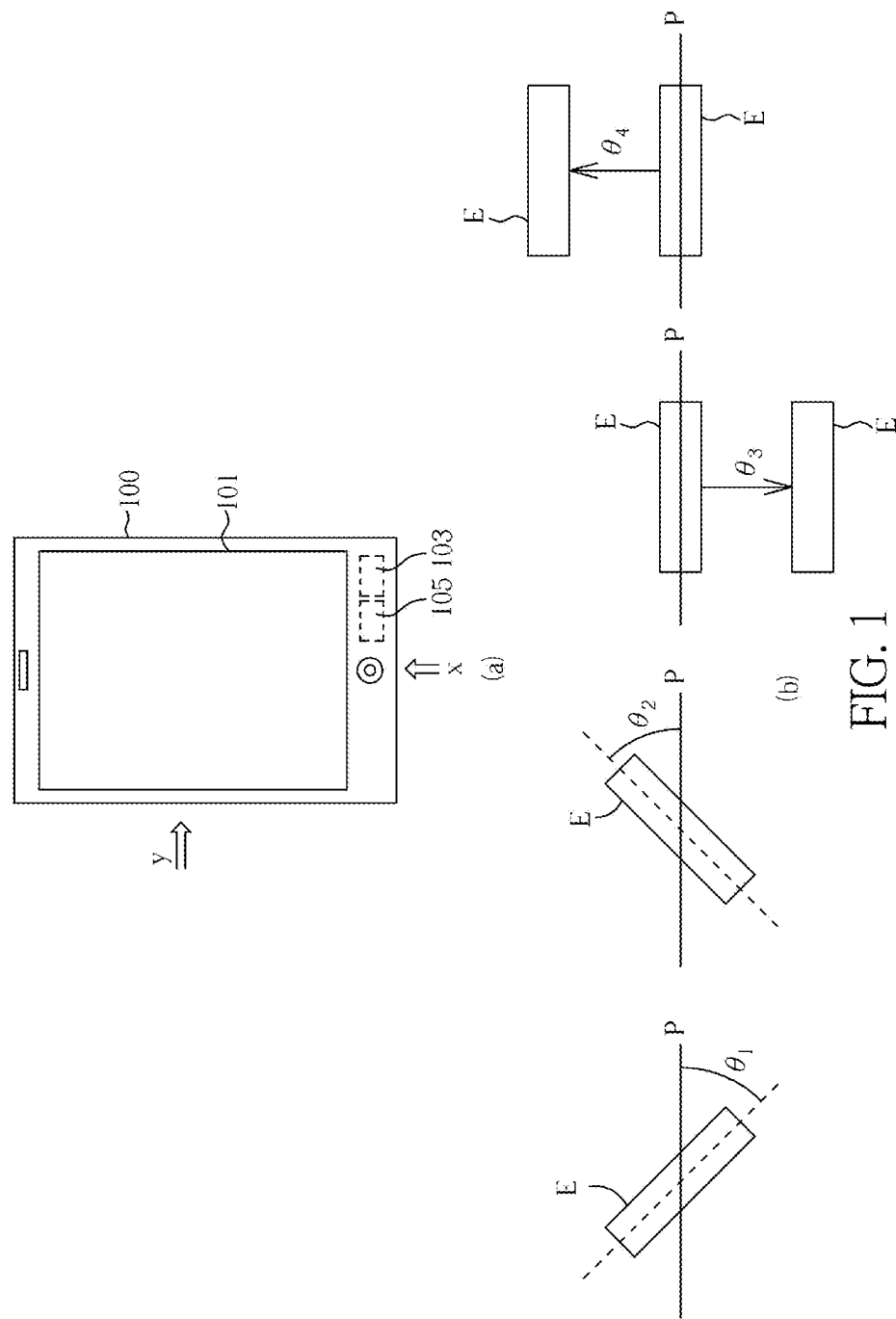
FIG. 1 is a block diagram of an electronic device according to an embodiment of the present invention.
Figure 2:
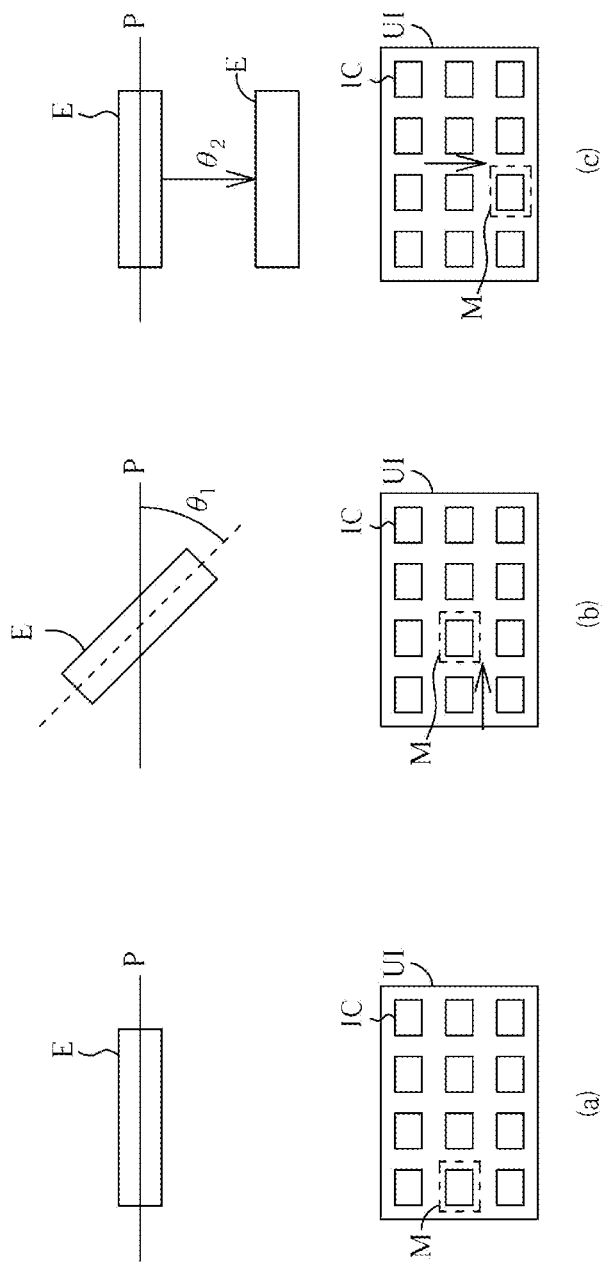
FIGS. 2 to 5 are block diagrams of a method for controlling an electronic device according to an embodiment of the present invention, for illustrating how a display status on a user interface is changed according to a tilt angle.
Figure 3:
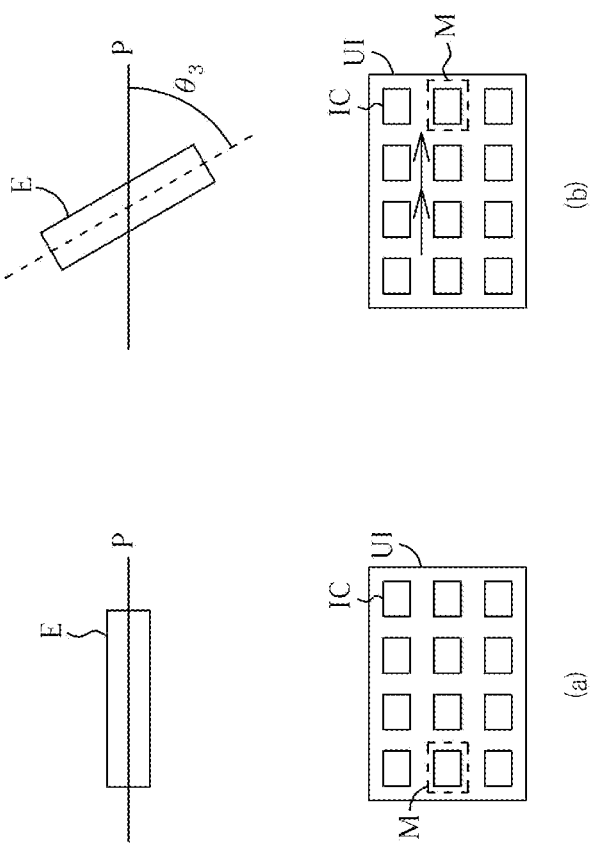
Figure 4:
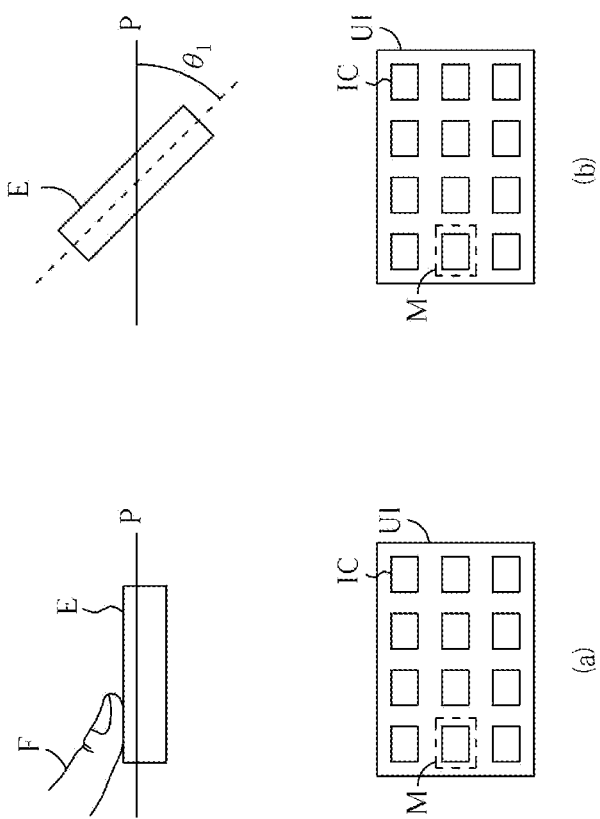
Figure 5:
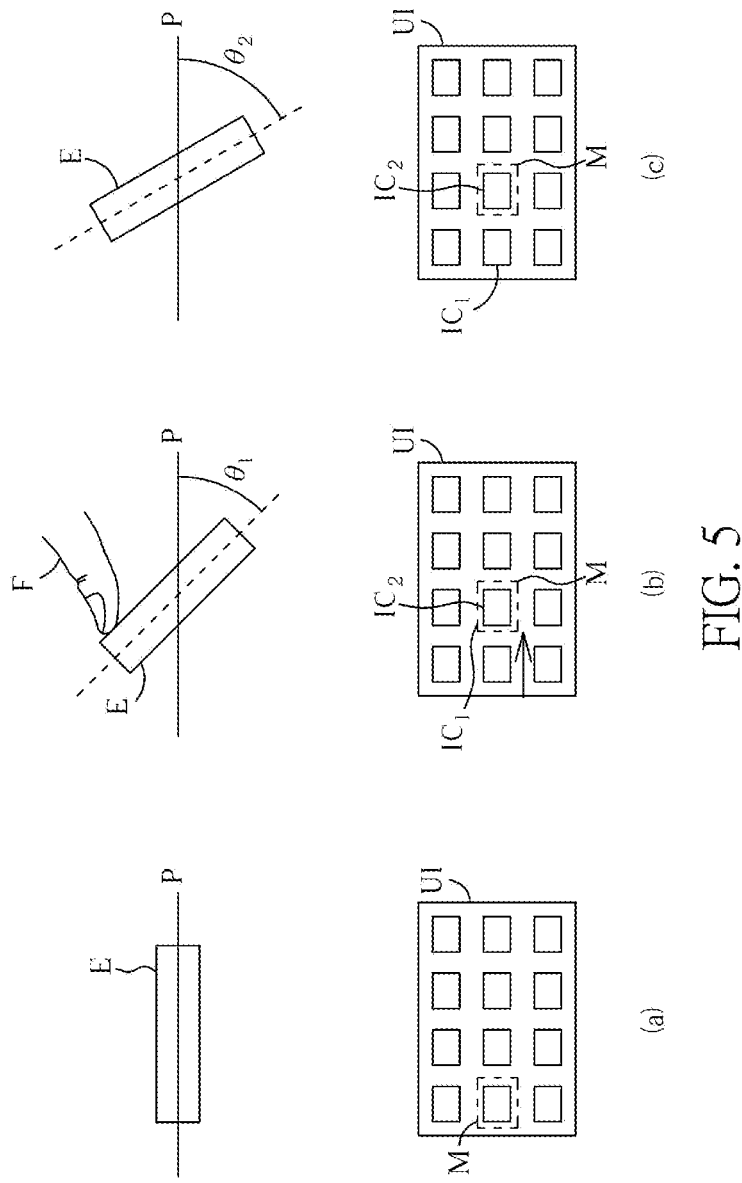

FIG. 1(a) shows an electronic device 100 according to an embodiment of the present invention. In the following description, a cell phone is merely taken as an example, and the present invention is not limited thereto. As shown in FIG. 1(a), the electronic device 100 includes a screen 101, a gravity sensor 103 and a control unit 105. The screen 101 displays different contents according to operations of the electronic device 100. The gravity sensor 103 detects whether the electronic device 100 is tilted at an angle relative to a reference plane, and is capable of detecting various tilt angles of the electronic device 100 in various directions. For example, when viewing from the x-direction in FIG. 1(a), the electronic device 100 may have tilt angles $\theta_1$, $\theta_2$, $\theta_3$ and $\theta_4$ relative to a reference plane P, as shown in FIG. 1(b). Similarly, when viewing from the y-direction in FIG. 1(a), the tilt angles $\theta_1$, $\theta_2$, $\theta_3$ and $\theta_4$ also exist between the electronic device 100 and the reference plane P, as shown in FIG. 1(b). For example, the electronic device 100 may include one or more gravity sensors to increase detection sensitivity. According to one single tilt angle, or a combination of several tilt angles, the control unit 103 controls the electronic device 100 to perform a designated operation behavior. The designated operation behavior may include a plurality of predetermined operations and changing a plurality of operation states, such as changing a displayed content image file, volume, or brightness of the screen. Some of the predetermined operations or changing the operation states may change a content image file displayed on the screen, while some may merely change the status of the electronic 100 without showing the changed state on the screen 101.

Different embodiments are given for illustrating a mechanism for controlling the electronic device according to a tilt angle or a combination of tilt angles. It should be noted that, the embodiments are for illustrative purposes, not limiting the scope of the present invention. For example, several tilt angles are given as examples in the embodiments, with however other various tilt angles also being applicable to the concept of the present invention.

FIG. 2 to FIG. 5 are a method for controlling an electronic device according to an embodiment of the present invention. In FIG. 2 to FIG. 5, how display statuses (i.e., executing different user interface operations) on a user interface are changed according to tilt angles are illustrated. As shown in FIG. 2(a), a user interface UI (displayed on the screen 101 in FIG. 1) includes multiple icons ICs and a selection mark M. The selection mark M indicates which icon IC is selected. In one embodiment, the selection mark M moves among the icons ICs according to a tilt angle. As shown in FIG. 2(b), when an electronic device E is tilted at an angle $\theta_1$, the selection mark M moves toward the right. In FIG. 2(c), when the electronic device E is tilted at an angle $\theta_2$ at a different direction, the selection mark M moves downward. The selection mark M may move at a greater speed as the tilt angle gets larger. Further, in FIGS. 3(a) and 3(b), when the electronic device E is tilted at an angle $\theta_3$ greater than $\theta_1$ in FIG. 2(b), the selection mark M moves at a greater speed among the icons ICs. That is, in one embodiment, the tilt angle is associated with a moving speed of the selection mark M.

In one embodiment, the method further includes a lock operation for locking the electronic device at a locked state. In the locked state, the electronic device does not perform a corresponding designated operation behavior according to the tilt angle or the combination of tilt angles. As shown in FIG. 4(a), the electronic device E is not tilted, nor is the selection mark M moved, and a finger F at this point may touch a screen of the electronic device E to trigger the lock operation to lock the electronic device E at a locked state. Therefore, referring to FIG. 4(b), even when the electronic device E is tilted at an angle $\theta_1$, the selection mark M remains still. In another embodiment, the lock operation may be triggered when the selection mark M is in a moving state. Referring to FIG. 5(a), the electronic device E in FIG. 5(a) is not tilted, and so the selection mark M is still. In FIG. 5(b), the electronic device E is tilted by an angle $\theta_1$, and the selection mark M moves from an icon $IC_1$ to an icon $IC_2$. At this point, assume that the finger F touches the screen of the electronic device E to trigger the lock operation. As a result, referring to FIG. 5(c), although the electronic device E is tilted by an angle $\theta_2$, the selection mark M yet remains still. It should be noted that, instead of being triggered by a finger, the lock operation may be triggered by other methods (e.g., triggered by a switch or by pressing the screen for a period of time). In another embodiment, the electronic device further includes a physical or virtual key. The electronic device continues detecting the tilt angle during a period that the user presses the key, and immediately performs a corresponding operation behavior according to a tilt angle at the time the user releases the key. The press may be regarded as a trigger operation, and the electronic device only detects the tilt angle when the key detects the trigger operation. Such mechanism is capable of enhancing operation accuracy when the user is in an unsteady environment.

Various other control mechanisms may be incorporated into the foregoing embodiments to allow a user to more conveniently control the electronic device. In one embodiment, as shown in FIG. 5(b), while the selection mark M is locked at the icon $IC_2$, the electronic device E may be designed to automatically execute a program corresponding to the icon $IC_2$. In another embodiment, again referring to FIG. 5(b), the user may rotate the electronic device E to another tilt angle (e.g., restoring the electronic device E to a horizontal state as in FIG. 5(a)) after the selection mark M locks at the icon $IC_2$, so that the electronic device E automatically executes the program corresponding to the icon $IC_2$. A user may freely define different combinations according to personal preference to make the method for controlling the electronic device even more convenient to oneself.

FIG. 6 to FIG. 9 show a method for controlling an electronic device according to an embodiment of the present invention. In FIG. 6 to FIG. 9, how an image file is played on the electronic device according to a tilt angle is illustrated. As shown in FIG. 6(a), the electronic device E is not tilted, and is playing an image file 1. In FIG. 6(b), the electronic device E is tilted by an angle $\theta_1$, and the electronic device E switches to a subsequent image file 2 of the image file 1. In FIG. 6(c), the electronic device E is tilted by an even greater angle $\theta_2$, and so the electronic device E quickly and continuously plays subsequent image files, i.e. the image file 2, an image file 3, an image file 4 and an image file 5. In another embodiment, the electronic device E may play image files in a skipping manner according to the tilt angle. Again refer to FIGS. 6(b) and 6(c). In FIG. 6(b), the electronic device E is tilted by a smaller angle $\theta_1$, and so the electronic device E skips to a subsequent image file 2 after playing the image file 1. In FIG. 6(c), the electronic device E is tilted by a greater angle $\theta_2$, and so, after playing the image file 2, the electronic device E skips the image file 3 and the image file 4 to the image file 5 that is originally after the image files 3 and 4. That is, in the embodiment in FIG. 6, the image file is played according to the tilt angle, which is associated with a playback speed and a playback order for playing the image files.

Figure 6:
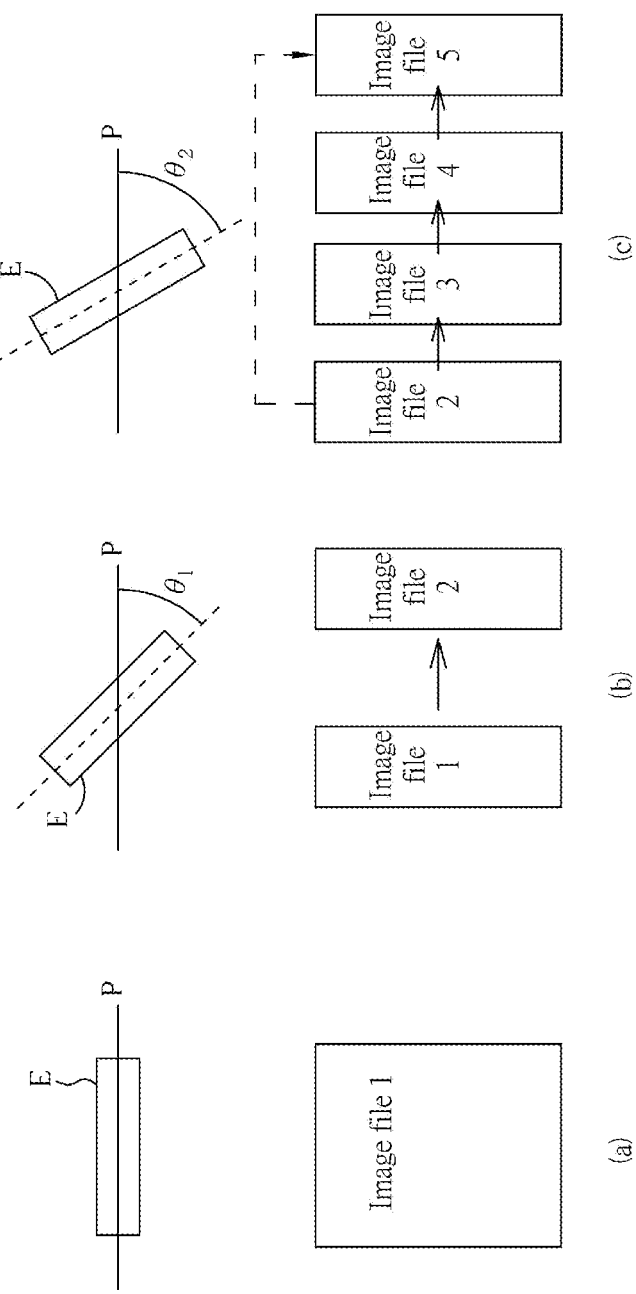
FIGS. 6 to 9 are block diagrams of a method for controlling an electronic device according to an embodiment of the present invention, for illustrating how an image file is played according to a tilt angle.
Figure 7:
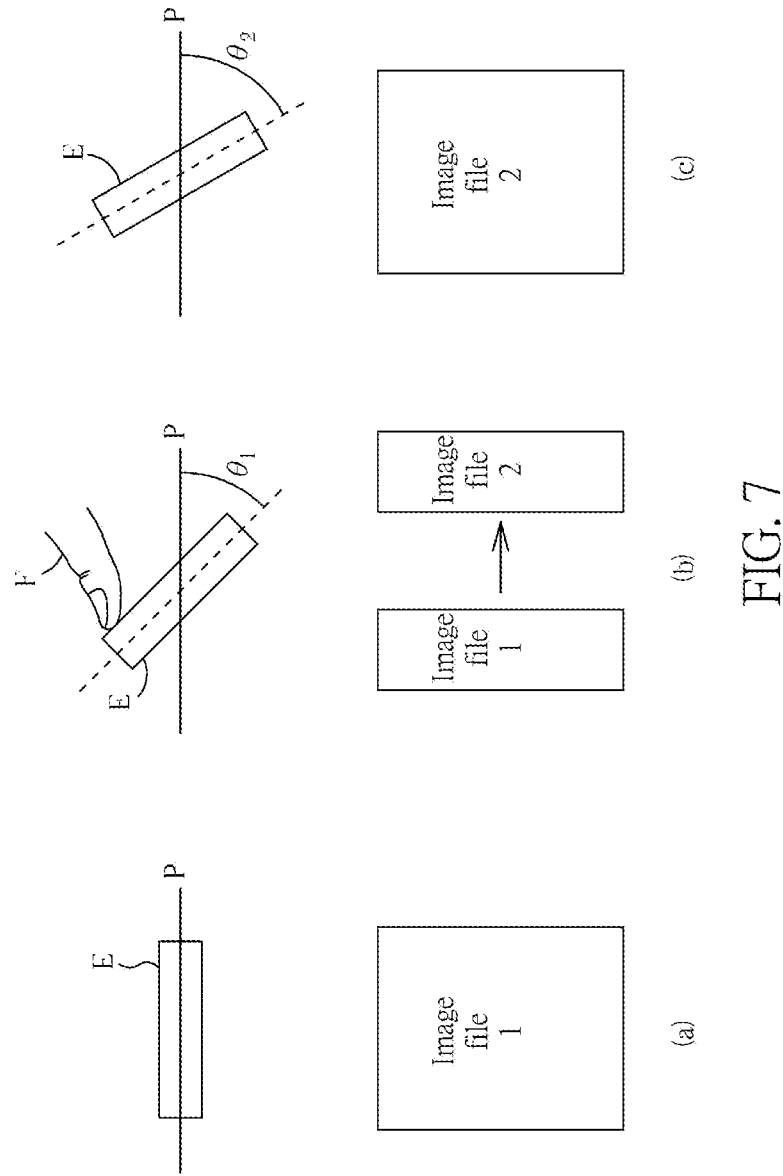
Figure 8:
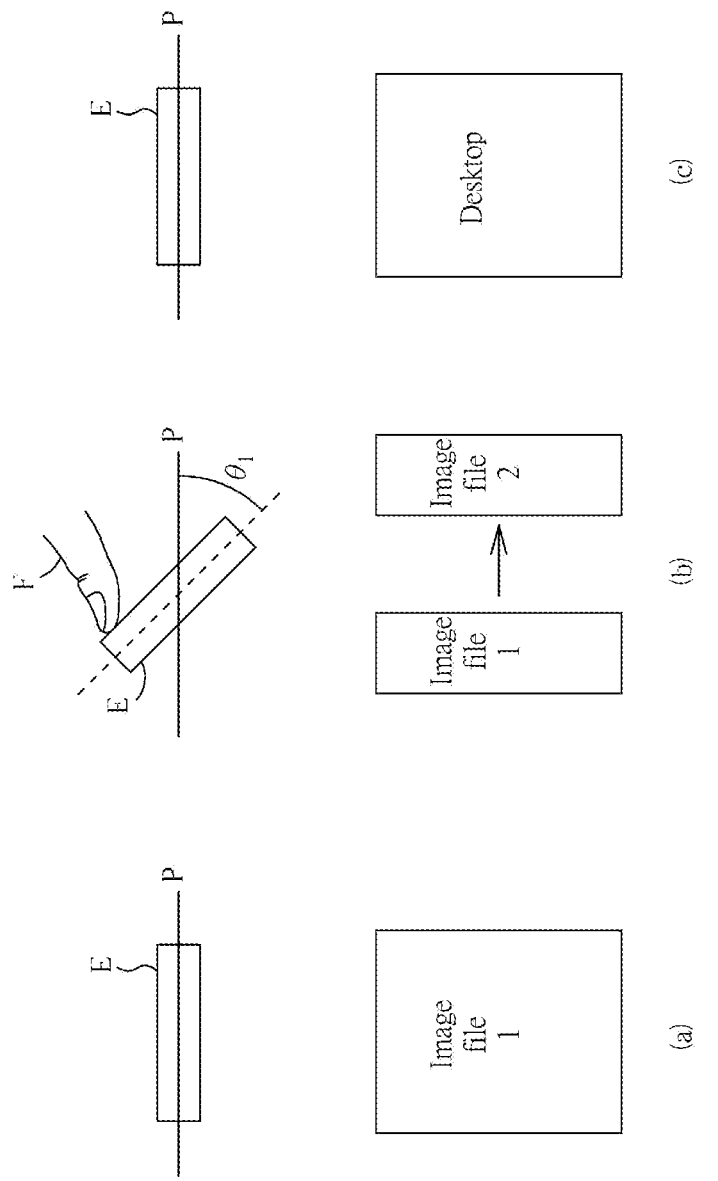

The embodiment in FIG. 6 may further include the foregoing lock operation. Referring to FIG. 7(a), the electronic device E is not tiled, and is playing the image file 1. In FIG. 7(b), the electronic device E is tilted by an angle $\theta_1$, and the electronic device E switches to the image file 2 as the next image file of the image file 1. At this point, the lock operation is also triggered by the finger F. Therefore, as shown in FIG. 7(c), even when the electronic device E is tilted by a larger angle $\theta_2$, the image file 2 is still being played. FIG. 8 shows an extended embodiment as a variation of the embodiment in FIG. 7. Operations in FIGS. 8(a) and 8(b) are the same as those in FIGS. 7(a) and 7(b), and shall be omitted herein. In FIG. 8(c), after the electronic device E is locked to play only the image file 2, assuming the electronic device E is rotated by another tilt angle (e.g., restoring the electronic device E to a horizontal state as in FIG. 8(c)), the electronic device E automatically sets the image file 2 as a desktop image of the electronic device E. In another embodiment, after locking at the image file 2, the electronic device E automatically sets the image file as a desktop image of the electronic device E. A user may freely define different combinations according to personal preference to make the method for controlling the electronic device even more convenient to oneself.

Figure 9:
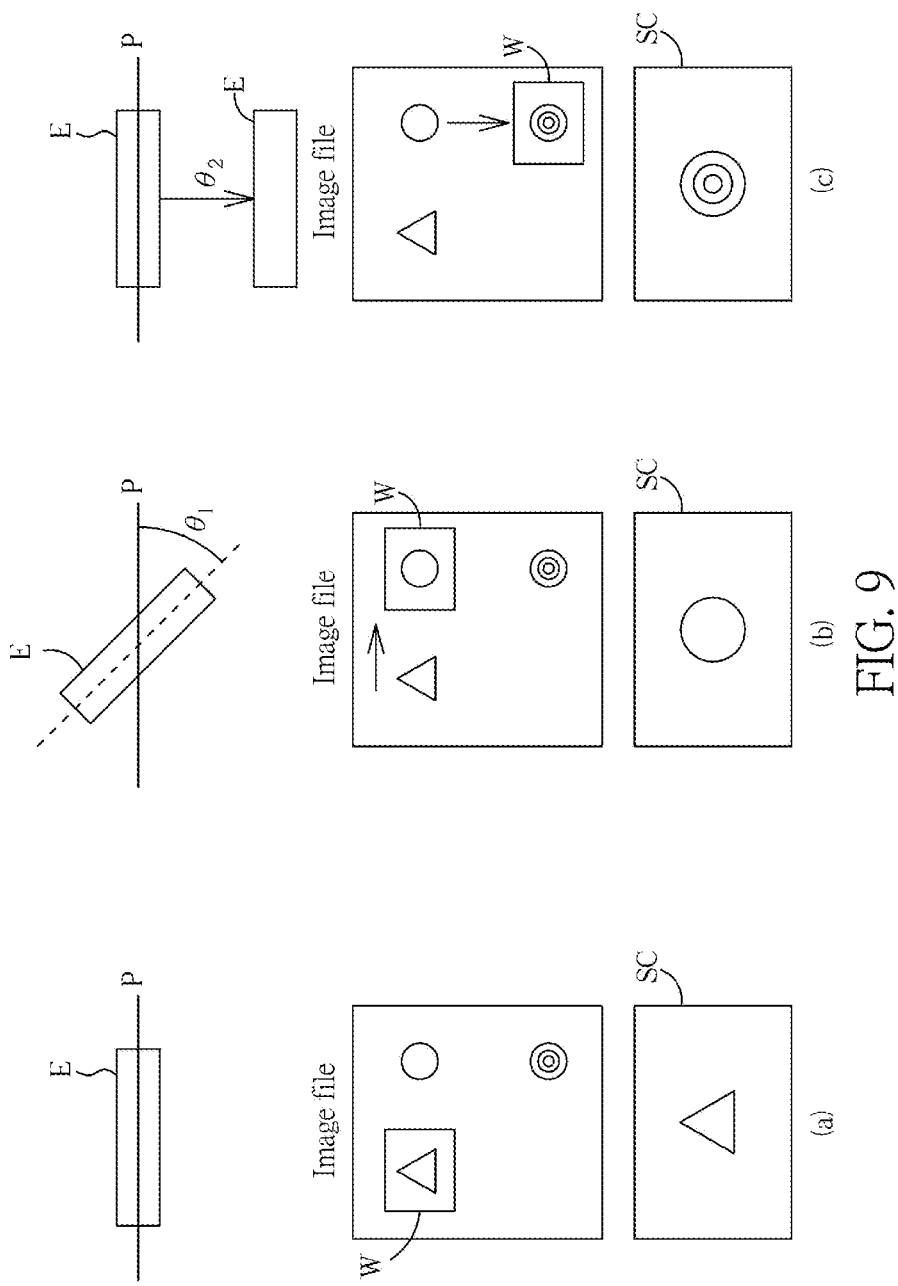

In embodiment in FIG. 9, the electronic device plays one single image file. To be specific, the electronic device E displays only a part of the displayed image file selected by a display window. Taking FIG. 9(a) for example, the image file includes patterns of a triangle, a circle and a multi-loop shape, with however a display window W marqueeing only the triangle. Therefore, a screen SC of the electronic device E displays only the triangle but not the other patterns. In FIG. 9(b), the electronic device E is tilted by an angle $\theta_1$, and so the display window W correspondingly moves to the right. As the display window W marquees the circle in the image file, the screen SC of the electronic device E displays only the circle but not the other patterns in the image file. In FIG. 9(c), the electronic device E is tilted by another angle $\theta_2$ at another direction, and so the display window W correspondingly moves downward. As the display window W at this point marquees the multi-loop shape, the screen SC of the electronic E displays only the multi-loop shape but not the other patterns in the image file. The embodiment in FIG. 9 is not limited to applications of an image file, and the image file may be replaced by other types of data (e.g., a webpage). Therefore, the embodiment in FIG. 9 may be simplified as the electronic displays a part of a plurality of sets of data, and the method for controlling an electronic device according to an embodiment of the present invention changes the part of the plurality of sets of data displayed by the electronic device according to the tilt angle. The data may be an image or a webpage, and the tilt angle is associated with a position of the part in the image file or the webpage. In another embodiment, when the electronic device supports multiple desktops, relative positions may be set for the desktops, and different desktops may be set according to the operation method in FIG. 9.

Figure 10:
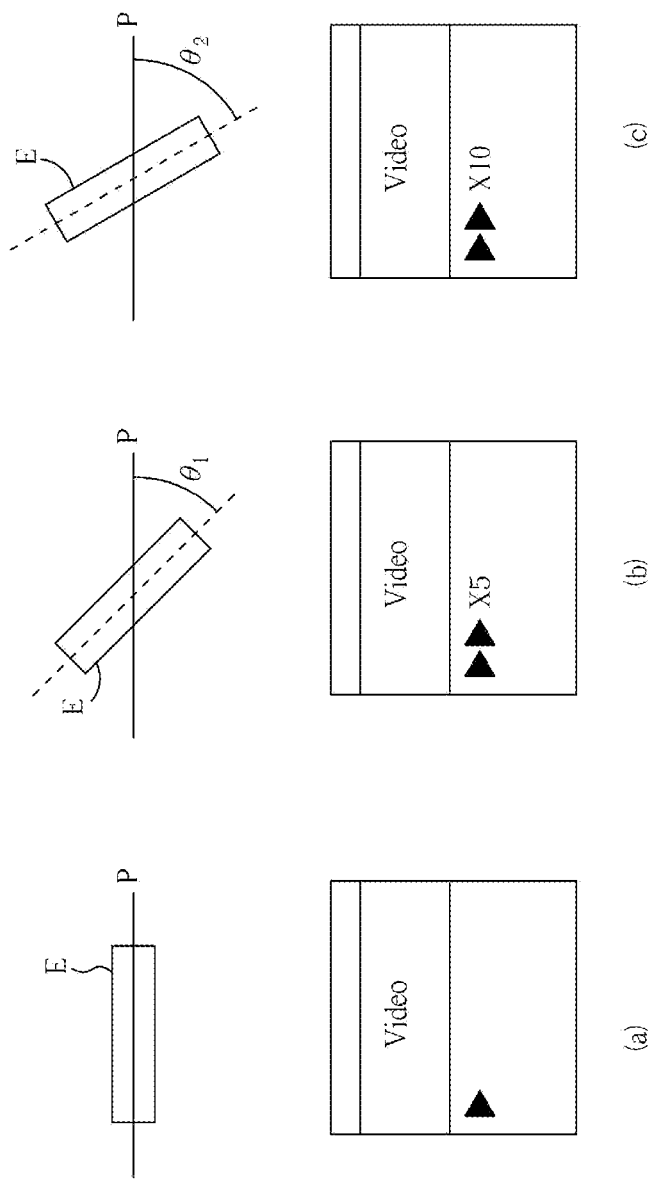
FIGS. 10 and 11 are block diagrams of a method for controlling an electronic device according to another embodiment of the present invention, for illustrating how playback of a video is controlled according to a tilt angle.
Figure 11:
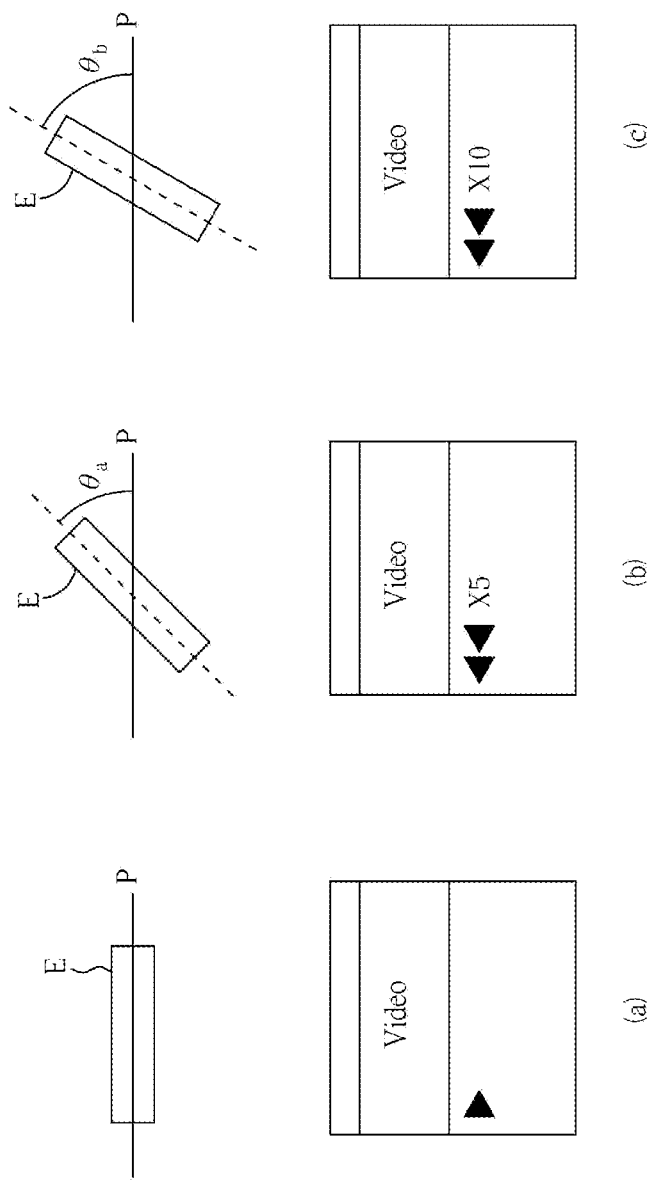

FIGS. 10 and 11 show a method for controlling an electronic device according to another embodiment of the present invention. In FIGS. 10 and 11, how a playback speed of a video played by an electronic device is controlled according to a tilt angle is depicted. In FIG. 10(a), the electronic device E is not tilted, and plays the video at a normal speed. In FIG. 10(b), the electronic device E is tilted by an angle $\theta_1$, and thus plays the video at a greater speed (5 times in this example). In FIG. 10(c), the electronic device is tilted at an even greater angle $\theta_2$, and so the electronic device E plays the video at an even greater speed (10 times in this example). Apart from controlling a forward playback speed of the video, the video may also be played in reverse according to the tilt angle, as shown in FIG. 11. In FIG. 11(a), the electronic device E is not tilted, and plays the video at a normal speed. In FIG. 11(b), the electronic device E is tilted by an angle $\theta_a$ (be noted that the angle $\theta_1$ in FIG. 10(b) and the angle $\theta_a$ in FIG. 11(b) are in different quadrants), the original forward playback is stopped, and the video is played in reverse at a greater speed (5 times in this example). In FIG. 11(c), the electronic device is tilted at an even greater angle $\theta_b$ (be noted that the angle $\theta_2$ in FIG. 10(c) and the angle $\theta_b$ in FIG. 11(c) are in different quadrants), and so the electronic device E plays the video in reverse at an even greater speed (10 times in this example). The embodiments in FIGS. 10 and 11 may also include the foregoing lock operation. That is, after triggering the lock operation, the electronic device E is locked at a specific section and the video does not move to other sections, or the electronic device E locks the video at a constant playback speed.

Figure 12:
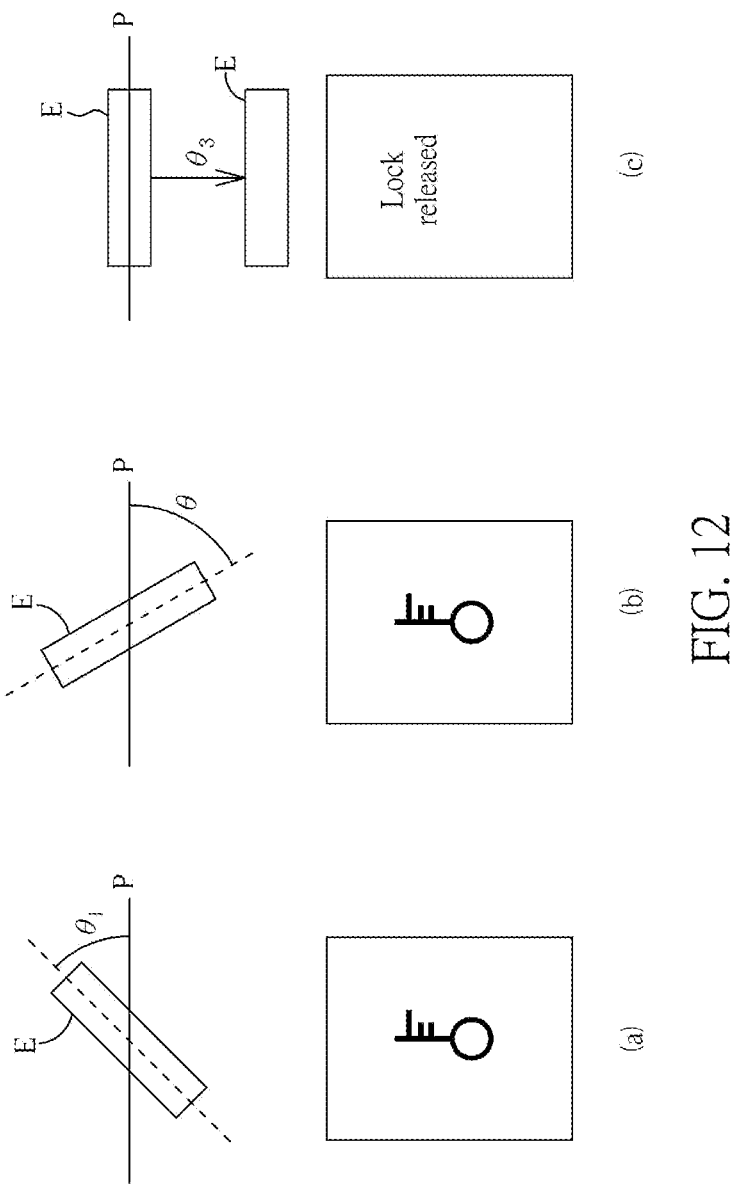
FIG. 12 is a block diagram of a method for controlling an electronic device according to another embodiment of the present invention, for illustrating how the electronic device is controlled according to a combination of tilt angles.

In the above embodiments, the electronic device is controlled via one single tilt angle. In another embodiment, an electronic device may also be controlled according to a combination of tilt angles. Referring to FIG. 12, assuming that the electronic device is originally at a horizontal state and a locked state, the control unit 105 in FIG. 1 may determine whether the electronic device completes rotations in three directions shown in FIGS. 12(a), 12(b) and 12(c) within a predetermined period and is rotated at tilt angles greater than $\theta_1$, $\theta_2$ and $\theta_3$ in FIGS. 12(a), 12(b) and 12(c). When the above steps are sequentially performed, the electronic device is unlocked. On the other hand, assuming the electronic device is original at a horizontal state and an unlocked state, by determining whether the electronic device is sequentially rotated satisfying the tilt directions and angles in FIGS. 12(a), 12(b) and 12(c), it is determined whether to control the electronic device to enter a locked state. It should be noted that, the invention is not limited to the tilt direction and angles in FIG. 12, nor is limited to executing functions of entering a locked state or releasing from a locked state. The embodiment in FIG. 12 may be summarized as, at least two tilt angles between an electronic device and a reference plane are detected within a predetermined period, and the electronic device is controlled to perform a designated operation behavior when the tilt angles satisfy a predetermined combination.

According to the foregoing embodiments, a user may control an electronic device through detecting a tilt angle of the electronic device, so as to prevent a situation of requiring both hands for manipulating the electronic device as in the prior art. Further, a user may set a value of the tilt angle or combinations of tilt angles as well as corresponding operations of the electronic device according to personal usage habits to provide an even more convenient method for controlling the electronic device.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for controlling an electronic device, comprising:
    detecting a first tilt angle on a first virtual plane between the electronic device and a reference plane in a first direction;
    detecting a second tilt angle on a second virtual plane between the electronic device and the reference plane in a second direction; and
    controlling the electronic device to perform an operation according to a combination of the first tilt angle and the second tilt angle when the electronic device is in an unlocked state, and not performing the operation when the electronic device is in a locked state;
    controlling the electronic device to operate in either the locked state or the unlocked state;
    when the combination of the first tilt angle and the second tilt angle satisfy a predetermined combination in a first predetermined time period, controlling the electronic device to operate in either the locked state or the unlocked state;
    wherein, the operation is associated with a user interface or an audio/video playback;
    wherein, the first virtual plane and the second virtual plane are different planes; and
    wherein, the electronic device is switched from the unlocked state to the locked state by a lock operation, and the lock operation is triggered by detecting a finger press on a screen of the electronic device for a second predetermined time period.

2. The method according to claim 1, wherein the electronic device is built-in with the user interface; the method detects the combination of the first tilt angle and the second tilt angle when the electronic device displays the user interface; and the operation comprises changing a display status of the user interface according to the first tilt angle.

3. The method according to claim 2, wherein the user interface displays a plurality of icons and a selection mark; the operation comprises the selection mark moving among the icons according to the combination of the first tilt angle and the second tilt angle; and the combination of the first tilt angle and the second tilt angle is associated with a moving speed of the selection mark.

4. The method according to claim 3, further comprising: the selection mark stopping moving according to the combination of the first tilt angle and the second tilt angle when the lock operation is detected.

5. The method according to claim 4, further comprising: when the lock operation is detected and the electronic device being rotated by a second tilt angle is further detected, executing a program corresponding to an icon selected by the selection mark.

6. The method according to claim 1, wherein the method detects the combination of the first tilt angle and the second tilt angle when the electronic device plays a plurality of image files; and the operation comprises playing the image files according to the combination of the first tilt angle and the second tilt angle.

7. The method according to claim 6, wherein the combination of the first tilt angle and the second tilt angle is associated with a playback speed of the image files.

8. The method according to claim 6, wherein the combination of the first tilt angle and the second tilt angle is associated with a playback order of the image files.

9. The method according to claim 6, further comprising: stopping playing the image files according to the combination of the first tilt angle and the second tilt angle when the lock operation is detected.

10. The method according to claim 6, further comprising: setting the image file being played as a desktop image of the electronic device when the lock operation is detected.

11. The method according to claim 6, further comprising: setting the image file being played as a desktop image of the electronic device when the lock operation is detected and the electronic device is rotated by the second tilt angle.

12. The method according to claim 1, wherein the method detects the combination of the first tilt angle and the second tilt angle when the electronic device displays a part of a plurality of sets of data; and the operation comprises changing the displayed part of the plurality of sets of data according to the combination of the first tilt angle and the second tilt angle.

13. The method according to claim 12, wherein the plurality of sets of data form an image file or a webpage, and the combination of the first tilt angle and the second tilt angle is associated with a position of the part in the image file or the webpage.

14. The method according to claim 12, wherein the plurality of sets of data are a plurality of desktops, and the part is one of the plurality of desktops.

15. The method according to claim 1, wherein the method detects the combination of the first tilt angle and the second tilt angle when the electronic device plays a video file; and the operation comprises adjusting a playback speed of the video file according to the combination of the first tilt angle and the second tilt angle.

16. The method according to claim 15, further comprising:
stopping playing the video file according to the playback speed; and
playing the video file in reverse according to a reverse playback speed corresponding to the second tilt angle.

17. The method according to claim 1, further comprising:
detecting the combination of the first tilt angle and the second tilt angle when a trigger operation is detected; and
when the trigger operation is released, performing the operation according to the combination of the first tilt angle and the second tilt angle at time of releasing the trigger operation.

18. An electronic device, comprising:
a screen;
a gravity sensor, configured to detect a first tilt angle on a first virtual plane between the electronic device and a reference plane in a first direction, and a second tilt angle on a second virtual plane between the electronic device and the reference plane in a second direction; and
a control unit, configured to control the electronic device to perform an operation according to a combination of the first tilt angle and the second tilt angle when the electronic device is in an unlocked state, and configured not to perform the operation when the electronic device is in a locked state;
wherein the electronic device operates in either the locked state or the unlocked state;
wherein, when the combination of the first tilt angle and the second tilt angle satisfy a predetermined combination in a predetermined time period, the control unit controls the electronic device to operate in either the locked state or the unlocked state;
wherein, the operation is associated with a user interface or an audio/video playback;
wherein, the first virtual plane and the second virtual plane are different planes; and
wherein, the electronic device is switched from the unlocked state to the locked state by a lock operation, and the lock operation is triggered by detecting a finger press on the screen for a second predetermined time period.

19. The electronic device according to claim 18, wherein the screen displays the user interface, and comprises a plurality of icons and a selection mark; the control unit moves the selection mark according to the combination of the first tilt angle and the second tilt angle; and the combination of the first tilt angle and the second tilt angle is associated with a moving speed of the selection mark.

20. The electronic device according to claim 19, wherein the selection mark stops moving according to the combination of the first tilt angle and the second tilt angle when the control unit detects the lock operation.

21. The electronic device according to claim 20, wherein when the control unit detects the lock operation and then detects that the electronic device is rotated by the second tilt angle, a program corresponding to an icon selected by the selection mark is executed.

22. The electronic device according to claim 18, wherein the screen plays a plurality of image files, and the operation comprises playing the image files according to the combination of the first tilt angle and the second tilt angle.

23. The electronic device according to claim 22, wherein the combination of the first tilt angle and the second tilt angle is associated with a playback speed of the image files.

24. The electronic device according to claim 22, wherein the combination of the first tilt angle and the second tilt angle is associated with a playback order of the image files.

25. The electronic device according to claim 22, wherein when the control unit detects the lock operation, the screen stops playing the image file according to the combination of the first tilt angle and the second tilt angle.

26. The electronic device according to claim 22, wherein when the control unit detects the lock operation, the image file being played is set as a desktop image of the electronic device.

27. The electronic device according to claim 22, wherein when the control unit detects the lock operation and the gravity sensor detectors that the electronic device is rotated by the second tilt angle, the image file being played is set as a desktop image of the electronic device.

28. The electronic device according to claim 18, wherein the screen displays a part of a plurality of sets of data, and the operation comprises changing the displayed part of the plurality of sets of data according to the combination of the first tilt angle and the second tilt angle.

29. The electronic device according to claim 28, wherein the plurality of sets of data form an image file or a webpage, and the combination of the first tilt angle and the second tilt angle is associated with a position of the part in the image file or the webpage.

30. The electronic device according to claim 18, wherein the screen plays a video file, and the operation comprises adjusting a playback speed of the video file according to the combination of the first tilt angle and the second tilt angle.

31. The electronic device according to claim 30, wherein when the gravity sensor detects the second tilt angle, the screen stops playing the video file according to the playback speed, and plays the video in reverse according to a reverse playback speed corresponding to the second tilt angle.

32. The electronic device according to claim 18, further comprising:

a key, configured to detect a trigger operation;

wherein, when the trigger operation is detected, the gravity sensor detects the combination of the first tilt angle and the second tilt angle; and when the key detects that the trigger operation is released, the operation is performed according to the combination of the first tilt angle and the second tilt angle at time of releasing the key.

33. A method for controlling an electronic device, comprising:

detecting a first tilt angle on a first virtual plane between the electronic device and a reference plane in a first direction;

detecting a second tilt angle on a second virtual plane between the electronic device and the reference plane in a second direction; and controlling the electronic device to perform an operation according to a combination of the first tilt angle and the second tilt angle when the electronic device is in an unlocked state, and not performing the operation when the electronic device is in a locked state;

controlling the electronic device to operate in either the locked state or the unlocked state;

when the tilt angles satisfy a predetermined combination in a first predetermined time period, controlling the electronic device to operate in either the locked state or the unlocked state;

wherein, the operation is associated with a user interface or an audio/video playback; and wherein, the first virtual plane and second virtual plane are different planes.

* * * * *